3,179,625
POLYURETHANE PREPOLYMER STABILIZATION WITH ACIDS
Wendell A. Ehrhart, Hellam, Pa., assignor to Armstrong Cork Company, Lancaster, Pa., a corporation of Pennsylvania
No Drawing. Filed Aug. 1, 1961, Ser. No. 128,372
9 Claims. (Cl. 260—75)

This invention relates generally to polyurethanes, and more particularly to polyurethanes formed from polyesters and polyethers, which polyurethanes are suitable for forming cast elastomeric products. Still more particularly the invention relates to the stabilization of the isocyanate-terminated polyurethane prepolymer which is an intermediate in the production of the final cast elastomeric product.

Cast polyurethanes made from polyesters are fully described in U.S. Patent No. 2,621,166—Schmidt et al. A linear polyester is prepared by reacting a dicarboxylic acid with a glycol in order to form a hydroxyl-terminated polyester having a hydroxyl number of 20–80 and an acid number of 0–5. A wide variety of dicarboxylic acids and glycols may be used in making the linear polyester. Mixtures of such acids and such glycols may also be employed.

The linear polyesters are then converted into the prepolymer by reacting the linear polyester with 20–250% excess of an organic diisocyanate having no other reactive groups on the molecule other than the isocyanate groups. This reaction converts the hydroxyl end groups of the polyester into urethane groups, and may accomplish chain-extension of the polyester. The reaction is carried out at elevated temperatures, usually in the range of 80°–150° C. Toward the end of the possible degree of linear chain-extension that can be achieved in this reaction, branching and cross-linking of the molecules will begin to occur. This branching and cross-linking manifests itself most obviously in an increasing viscosity of the reaction solution. The increasing viscosity means that the polymeric network is becoming increasingly complex.

As a final step in the preparation of the desired product, the isocyanate-terminated polyurethane prepolymer prepared by the reaction of the excess of organic diisocyanate with the polyester is subsequently further chain-extended and cross-linked by adding to the reactive prepolymer a so-called cross-linking agent such as a glycol, a diamine, an amino-alcohol, or a mixture of such compounds. Branching centers formed previously lead to true cross-links in this step. The cross-linking agent is admixed at elevated temperature with the reactive prepolymer, and the mixture is cast, usually in a heated mold or press, in order to form the desired cured product.

Probably the greatest difficulty encountered in the entire process is the control of the degree of branching and cross-linking in the isocyanate-terminated polyurethane prepolymer. Once the prepolymer has achieved the desired degree of chain-extension along with the establishment of some branching centers and a few cross-links, the prepolymer may be cooled to inhibit further reaction. The quicker the cooling, the more certain the stopping of the reaction at the desired point. The prepolymer may then generally be stored in a cool condition without further chemical change until it is needed for mixing with the polyfunctional cross-linking agent to form the final product. However, the prepolymer must again be melted and degassed by heating under a vacuum before the cross-linking agent can be added. If this is not done rapidly the viscosity of the polymer swiftly increases, showing that branching and cross-linking is taking place by means of the reaction of isocyanate groups with the urethane linkages in the isocyanate-terminated polymer. Since the percentage of isocyanate groups in the polymer must be used to calculate the exact amount of polyfunctional cross-linking agent to be added to the prepolymer to give optimum properties, these changes which occur in the prepolymer on reheating bring about inaccuracies in the relative amounts of ingredients and affect such processing variables as gel time and demolding time, as well as changing in an undesirable manner the physical properties of the final elastomers.

In modern practice, the reactive prepolymer and the polyfunctional cross-linking agent are frequently admixed at elevated temperature in a special machine designed for the purpose. In these machine casting processes, if for some reason the hot prepolymer is kept in the machine for too long a time, the prepolymer may gel in the machine. Thus it can be seen that there is a great need for a stabilized prepolymer which will not undergo further chemical change while being subjected to heat. Proper stabilization of the prepolymer also allows a better degree of control of the degree of branching in the prepolymer, and the production of more consistent physical properties in the final cast elastomers.

It is the primary object of the present invention to supply such a stabilized prepolymer. It is a further object of the present invention to supply a process whereby the degree of branching and cross-linking established in the formation of a prepolymer may be stopped and maintained at any desired level. It is still another object of the present invention to present a process for stabilizing against the action of heat an isocyanate-terminated polyurethane prepolymer.

These objects are accomplished in a surprisingly straightforward and effective manner. The invention contemplates the addition to the heated mixture containing the isocyanate-terminated polyurethane prepolymer of an acid in an amount of about 0.001–2% by weight acid based on the weight of said mixture, the acid having a dissociation constant greater than $1 \times 10^{-5}$.

The term "acid" as used herein defines a compound which, on dissociation or reaction in solution, yields excess hydrogen ions. Thus the definition of the term "acid" is used herein in terms of the dissociation theory. It has been found that the acid to be useful in the present process must possess a certain strength at least. This minimum strength may be defined as being at least greater than compounds having a dissociation constant greater than $1 \times 10^{-5}$. Acids which are weaker than this minimum strength exert insufficient stabilizing effects on the reactive prepolymer.

Following is a list of suitable acids and the dissociation or ionization constant of each as set forth in Lange's Handbook of Chemistry, 9th Edition:

| Acid | K |
|---|---|
| Bromoacetic | $1.35 \times 10^{-3}$ |
| Chloroacetic | $1.396 \times 10^{-3}$ (activity constant) |
| o-chlorobenzoic | $1.197 \times 10^{-3}$ (activity constant) |
| Cinnamic (cis) | $1.32 \times 10^{-4}$ |
| Citraconic | $3.33 \times 10^{-3}$ |
| Citric | $8.7 \times 10^{-4}$ ($K_1$) |
| Diethylmalonic | $7.08 \times 10^{-4}$ |
| Diphenylacetic | $1.15 \times 10^{-4}$ |
| Formic | $1.77 \times 10^{-4}$ |
| Fumaric | $9.3 \times 10^{-4}$ ($K_1$) |
| Hydrofluoric | $7.2 \times 10^{-4}$ |
| Itaconic | $1.46 \times 10^{-4}$ ($K_1$) |
| Lactic | $1.387 \times 10^{-4}$ (activity constant) |
| Maleic | $1.0 \times 10^{-2}$ ($K_1$) |
| Malic | $4 \times 10^{-4}$ ($K_1$) |
| Malonic | $1.397 \times 10^{-3}$ ($K_1$) |
| a-naphthoic | $2.0 \times 10^{-4}$ |
| o-nitrobenzoic | $6.71 \times 10^{-3}$ |
| Oxalic | $6.5 \times 10^{-2}$ ($K_1$) |
| Phosphoric | $7.5 \times 10^{-3}$ ($K_1$) |
| Phosphorous | $1.6 \times 10^{-2}$ ($K_1$) |
| o-phthalic | $1.3 \times 10^{-3}$ ($K_1$) |
| Picric | $4.2 \times 10^{-1}$ (activity constant) |
| Pyrophosphoric | $1.4 \times 10^{-1}$ ($K_1$) |
| Salicylic | $1.06 \times 10^{-3}$ ($K_1$) |
| Tartaric | $9.6 \times 10^{-4}$ ($K_1$) |
| Trichloracetic | $1.3 \times 10^{-1}$ |
| Uric | $1.3 \times 10^{-4}$ |

Polyethers may be used in the same manner as the polyesters. For the purposes of the present invention, the linear polyethers perform in the same manner as the linear polyesters. This is true because the only reactive group in both of the linear molecules is the hydroxyl group found at each end of both the polyethers and the polyesters. A typical polyether is prepared by polymerizing tetrahydrofuran. The ring opens, polymerization occurs to yield a straight chain having ether linkages scattered along its length, with the usual hydroxyl termination. Such a linear polyether is reacted with an excess of an organic diisocyanate containing no other reactive groups on the molecule other than the isocyanate groups, in the same manner as the polyesters. These isocyanate-terminated polyurethane prepolymers also require stabilization during and before treatment with a polyfunctional cross-linking agent in order to form useful cast elastomers.

The acid to be used in the present invention is merely added with vigorous stirring to the hot prepolymer. Stabilization occurs immediately. Different prepolymers will require different amounts of acid stabilizers, depending on, among other things, the amount of basic impurities present in the polyester or polyether and on the amount of acidic impurities present in the diisocyanate used to form the prepolymer. Frequently, very small amounts of strong acids such as sulfuric acid or p-toluene sulfonic acid achieve adequate stabilization. Variations in raw materials cause variations in the amount of acid to be used. Furthermore, the precise strength of the acid will be a factor in that lesser amounts of the stronger acids will be needed to achieve the same degree of desired stabilization. Experience has shown that a prepolymer made from ethylene adipate polyester and 2,4-toluene diisocyanate in the preparation of soft stock polyurethanes is well stabilized by the addition of 0.05% p-toluene sulfonic acid. Unduly large amounts of the acid cause difficulties in neutralization of the acid when the polyfunctional cross-linking agent is added to form the finished cast elastomer. For these reasons, the range of amounts of the acid stabilizer will be about 0.001–2% by weight based on the weight of the heated mixture containing the prepolymer.

The following examples illustrate several embodiments of the invention. All acids used have an ionization constant greater than $1 \times 10^{-5}$. All parts are by weight unless otherwise stated.

*Example 1*

Into a flask was placed 4,000 parts of an ethylene adipate polyester having a hydroxyl number of 58.2 and an acid number of 1.18. The polyester was heated to 100° C. and there was then added 745 parts (2.02 equivalents) of 2,4-toluene diisocyanate. The temperature was maintained at 100° C. After 15 minutes of stirring during which time the temperature had risen to 135° C., 369 parts of 4,4-diphenylmethane diisocyanate was added, and the temperature was brought back to 135° C. The vessel was evacuated to 8 millimeters of mercury absolute with stirring until the viscosity had reached 24 seconds as determined by a number 4 Zahn cup. There was then added 5.1 parts of p-toluene sulfonic acid monohydrate and the mixture was stirred vigorously and degassed at 135° C. in 8 millimeters pressure for 30 minutes. During this additional 30 minutes the viscosity did not change. A control run made under identical conditions except that no p-toluene sulfonic acid monohydrate was added increased in viscosity in the 30 minutes to 60 seconds using the number 4 Zahn cup.

The percentage NCO groups of the acid-stabilized prepolymer was found to be 5.77%. When a sample of the stabilized prepolymer was kept in an oven maintained at 110° C. for 20 hours, the viscosity was found to be 22.5 seconds and the percent NCO groups was found to be 5.60, very little change. Samples containing no acid stabilizer gelled when placed in the oven under similar conditions.

The acid-stabilized prepolymer was thoroughly admixed at a temperature of 125° C. with 0.8–1.1 equivalents of bis (2-hydroxy ethyl) hydroquinone containing 1% by weight N-ethylmorpholine. A gel time of 6 minutes was obtained. Increasing the N-ethylmorpholine to 1.5% did not change the gel time within experimental error. Castings made by this system were demoldable after about 45 minutes in the mold.

*Example 2*

To 55,940 parts of a dehydrated ethylene adipate polyester having a hydroxyl number of 52.3 and an acid number of 1.38 maintained at a temperature of about 85° C. was added with stirring a mixture of 9,520 parts 2,4-toluene diisocyanate and 5,320 parts of 4,4'-diphenylmethane diisocyanate. The temperature of the isocyanate mixture was 100° C. at the time of addition. After 15 minutes, during which time the temperature had risen to 120° C. from the exotherm, heat was applied to raise the temperature to 132° C. This temperature was reached in 15 minutes, whereupon the batch was maintained at this temperature for 20 minutes under a pressure of 20 millimeters of mercury absolute. The viscosity was then 23 seconds as measured by a number 4 Zahn cup. To the heated mixture was added 35.4 parts (0.05% by weight) of dehydrated p-toluene sulfonic acid, and stirring was continued under the 20-millimeter pressure for an additional 15 minutes. The temperature was dropped to 120° C. and the reactive prepolymer was drained into cans. The weight percentage of NCO groups in the prepolymer was found to be 5.55% and the viscosity at 120° C. was 30 seconds. After an additional 4 hours being maintained at 120° C. and 20 millimeters pressure of mercury absolute, no change in viscosity was detected and the weight percentage of NCO groups dropped to 5.39%. Prepolymers prepared without the acid stabilization showed viscosity increases of 35 seconds to a final viscosity of 65 seconds.

*Example 3*

A series of prepolymers was made. The first prepolymer possessed a polyether backbone obtained by polymerizing tetrahydrofuran, followed by reacting two equivalents of 2,4-toluene diisocyanate with one equivalent of the polyether. This prepolymer was identified as Prepolymer A.

A degassed ethylene adipate polyester having an average equivalent weight of 993 (hydroxyl number 55.2, acid number 1.3) in an amount of 4,965 parts was heated to 90° C. There was then added with stirring a mixture of 870 parts (10 equivalents) of 2,4-toluene diisocyanate and 625 parts (5 equivalents) of 4,4'-diphenylmethane diisocyanate. After the exotherm had begun to level off, heat was applied to take the temperature to 135° C. The flask was then evacuated to 10 millimeters mercury absolute and the mixture stirred at this temperature for 30 minutes. At the end of this time the mixture was poured into quart cans and allowed to cool to room temperature. This prepolymer was identified as Prepolymer B.

A propylene adipate polyester having an equivalent weight of 1192 (hydroxyl number 43.88, acid number 3.12) in an amount of 2,127 parts (1.785 equivalents) was degassed for 12 minutes at 130° C. under a pressure of 8 millimeters of mercury absolute. After cooling to 90° C., there was added 668.8 parts (5.35 equivalents) of 4,4'-diphenylmethane diisocyanate maintained at 115° C. The mixture was then heated to 135° C. and held at that temperature with stirring for 55 minutes. The mixture was then poured into quart cans and allowed to cool to room temperature. This prepolymer was identified as Prepolymer C.

Samples of the three above-described prepolymers, A, B and C, were heated to 135° C. and their respective viscosities determined using a number 4 Zahn cup. After being held at this temperature for three hours, the viscosities were determined again. This procedure was then repeated with other samples from the same prepolymers with the exception that various acids (5.8 milliequivalents of acid per 100 grams of prepolymer) were added to the respective samples as soon as the temperatures reached 135° C. The viscosity was then determined again after the sample had been held at 135° C. for three hours after the acid addition.

The results of these runs are summarized in the following table:

| Prepolymer (Parts) | Acid (Parts) | Viscosity in Secs. | |
|---|---|---|---|
| | | Before Heating | After Heating |
| A (800) | None | 19 | 39 |
| A (856) | p-Toluenesulfonyl chloride (0.95) | 19 | 25.5 |
| A (850) | Hydrogen chloride, dry | 19 | 30 |
| A (840) | Pyruvic acid (0.43) | 19 | 26 |
| A (820) | Citric acid monohydrate (0.33) | 19 | 32 |
| A (800) | Trichloroacetic acid (0.76) | 19 | 29.5 |
| A (800) | Fumaric acid (0.27) | 19 | 32.5 |
| B (890) | None | 20 | 70 |
| B (812) | Boron trifluoride diethyl ether (0.66) | 20 | 33 |
| B (925) | 85% phosphoric acid (0.33) | 20 | 29 |
| B (840) | Conc. sulfuric acid (0.24) | 20 | 23 |
| B (1,000) | Terphthalyl chloride (0.59) | 20 | 28 |
| C (795) | None | 33 | 59 |
| C (764) | Oxalic acid (0.20) | 33 | 47 |
| C (800) | Picric acid (1.0) | 33 | 44 |

I claim:
1. A method of preparing a heat-stable isocyanato-terminated polyurethane prepolymer which comprises heating a mixture of an excess of organic diisocyanate having no reactive groups on the molecule than the isocyanato groups with a polymer selected from the group consisting of polyethers and polyesters to cause chain-extension of said polymer and the formation of said isocyanato-terminated polyurethane prepolymer, continuing to heat said mixture to achieve the desired degree of branching and cross-linking in said prepolymer, and subsequently adding to said heated mixture to stop subsequent branching and cross-linking 0.001–2% by weight based on the weight of said mixture of an acid having a dissociation constant greater than $1 \times 10^{-5}$.

2. A method according to claim 1 wherein said polymer comprises ethylene adipate polyester.

3. A method according to claim 1 wherein said polymer comprises propylene adipate polyester.

4. A method according to claim 1 wherein said polymer comprises a polyether prepared by the polymerization and ring opening of tetrahydrofuran.

5. A method according to claim 1 wherein said organic diisocyanate comprises 4,4'-diphenylmethane diisocyanate.

6. A method according to claim 1 wherein said organic diisocyanate comprises 2,4-toluene diisocyanate.

7. A method according to claim 1 wherein said organic diisocyanate comprises a mixture of 2,4-toluene diisocyanate and 4,4'-diphenylmethane diisocyanate.

8. A method according to claim 1 wherein said acid comprises sulfuric acid.

9. A method according to claim 1 wherein said acid comprises paratoluene sulfonic acid.

References Cited by the Examiner

UNITED STATES PATENTS

| 2,437,232 | 3/48 | Rothrock et al. | 260—45.7 |
| 3,067,149 | 12/62 | Dombrow et al. | 260—2.5 |
| 3,087,900 | 4/63 | Brown | 260—45.85 |
| 3,087,901 | 4/63 | Brown | 260—45.85 |

FOREIGN PATENTS

| 767,017 | 1/57 | Great Britain. |
| 748,697 | 5/56 | Great Britain. |

LEON J. BERCOVITZ, *Primary Examiner.*

H. N. BURSTEIN, *Examiner.*